(12) United States Patent
Kapur et al.

(10) Patent No.: US 7,620,628 B2
(45) Date of Patent: Nov. 17, 2009

(54) SEARCH PROCESSING WITH AUTOMATIC CATEGORIZATION OF QUERIES

(75) Inventors: Shyam Kapur, Sunnyvale, CA (US); Jignashu Parikh, Jamnagar (IN); Deepa Joshi, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 378 days.

(21) Appl. No.: 11/006,466

(22) Filed: Dec. 6, 2004

(65) Prior Publication Data

US 2006/0122979 A1 Jun. 8, 2006

(51) Int. Cl.
G06F 17/30 (2006.01)
(52) U.S. Cl. .............................. 707/4; 707/6
(58) Field of Classification Search ............ 707/3, 707/6, 100, 104.1, 4
See application file for complete search history.

(56) References Cited

U.S. PATENT DOCUMENTS 6,424,973 B1 7/2002 Baclawski (Continued)

FOREIGN PATENT DOCUMENTS

WO WO 02/19147 A1 3/2002

OTHER PUBLICATIONS

Ipeirotis et al., "Probe, count, and classify: categorizing hidden web databases", Proceedings of the 2001 ACM SIGMOD international conference on Management of data , p. 67-78, May 2001. Retrived from the Internet: < URL: http://portal.acm.org/ft_gateway.cfm?id=375671&type=pdf&coll=ACM&dl=ACM&CFID=48417025&CFTOKEN=19109216>.*

(Continued)

Primary Examiner—John E Breene
Assistant Examiner—Dennis Myint
(74) Attorney, Agent, or Firm—Hickman, Palermo, Truong & Becker LLP

(57) ABSTRACT

Search results are processed using search requests, including analyzing received queries in order to provide a more sophisticated understanding of the information being sought. A concept network is generated from a set of queries by parsing the queries into units and defining various relationships between the units. From these concept networks, queries can be automatically categorized into categories, or more generally, can be associated with one or more nodes of a taxonomy. The categorization can be used to alter the search results or the presentation of the results to the user. As an example of alterations of search results or presentation, the presentation might include a list of "suggestions" for related search query terms. As other examples, the corpus searched might vary depending on the category or the ordering or selection of the results to present to the user might vary depending on the category. Categorization might be done using a learned set of query-node pairs where a pair maps a particular query to a particular node in the taxonomy. The learned set might be initialized from a manual indication of which queries go with which nodes and enhanced has more searches are performed. One method of enhancement involves tracking post-query click activity to identify how a category estimate of a query might have varied from an actual category for the query as evidenced by the category of the post-query click activity, e.g., a particular hits of the search results that the user selected following the query. Another method involved determining relationships between units in the form of clusters and using clustering to modify the query-node pairs.

5 Claims, 8 Drawing Sheets

U.S. PATENT DOCUMENTS

| | | | |
|---|---|---|---|
| 6,460,034 B1 * | 10/2002 | Wical | 707/5 |
| 6,631,372 B1 | 10/2003 | Graham | 707/5 |
| 6,853,982 B2 | 2/2005 | Smith et al. | 705/27 |
| 6,922,691 B2 | 7/2005 | Flank | |
| 2002/0059161 A1 | 5/2002 | Li | 707/1 |
| 2002/0188586 A1 | 12/2002 | Veale | |
| 2003/0014399 A1 * | 1/2003 | Hansen et al. | 707/3 |
| 2003/0115191 A1 | 6/2003 | Copperman et al. | |
| 2003/0126561 A1 | 7/2003 | Woehler et al. | |
| 2003/0217052 A1 | 11/2003 | Rubencyk et al. | |
| 2003/0220913 A1 * | 11/2003 | Doganata et al. | 707/3 |
| 2004/0111408 A1 | 6/2004 | Caudill et al. | 707/3 |
| 2004/0220905 A1 * | 11/2004 | Chen et al. | 707/3 |
| 2004/0225555 A1 | 11/2004 | Persidis et al. | 705/10 |
| 2004/0260677 A1 * | 12/2004 | Malpani et al. | 707/3 |
| 2004/0267709 A1 * | 12/2004 | Ji et al. | 707/3 |
| 2005/0234879 A1 | 10/2005 | Zeng et al. | |
| 2005/0234953 A1 | 10/2005 | Zhang et al. | |

OTHER PUBLICATIONS

Huang et al., "Using a web-based categorization approach to generate thematic metadata from texts", ACM Transactions on Asian Language Information Processing, vol. 3, Issue 3 (Sep. 2004), p. 190-212. Retrieved from the Internet:< URL: http://portal.acm.org/ft_gateway.cfm?id=1037812&type=pdf&coll=ACM&dl=ACM&CFID=48417025&CFTOKE=19109216>.*

Chang, C. et al., "Integrating query expansion and conceptual relevance feedback for personalized Web information retrieval" *Computer Networks and ISDN Systems* (1998) pp. 621-623.

"Notification of Transmittal of the International Search Report and the Written Opinion of the International Searching Authority, or the Declaration" received in corresponding International application No. PCT/US2005/043196.

"Notification of Transmittal of the International Search Report and the Written Opinion of the International Searching Authority, or the Declaration" received in International application No. PCT/US04/37571.

* cited by examiner

| Keywords: | quotes | | Find Categories |

| Original Categories | New Possible Categories | Confidence |
|---|---|---|
| Finance/Investment | Books/Fiction/Literature and Poetry | 81 |
| | All Finance | 57 |
| | Finance/Investment | 57 |
| | Reference | 41 |
| | Social Science/Language and Linguistics | 35 |
| | Online Greetings | 23 |
| | All Sex and Romance | 21 |

FIG. 10

YAHOO! search  1100

Search Home - Yahoo! - Help

Your Search: quotes    [Search]

Related: love quotes, famous quotes, movie quotes, funny quotes - More...

What's New | Send Feedback

Web | Directory | News | Yellow Pages | Images

INSIDE YAHOO!
Quotations: find Quotes at Yahoo! Reference
Categories: • Financial Quotes  • Quotations  • Currency Exchange Rates  • More...

SPONSOR RESULTS  (What's this?) (Become a Sponsor)

•Mortgage Quotes - Click Here - mortgages: Fill out our form online and get mortgage quotes.

TOP 20 WEB RESULTS out of about 14,400,000

1. Bartlett's Familiar Quotations
passages, phrases, and proverbs traced to their sources.
www.----.edu/----  cached | ↪ More sites about: Quotations 2. Yahoo! Finance
Real-Time Package Live streaming quotes. Business News. ... My Recent Quotes.
Symbol, Name, Last, Change, ...
quote.yahoo.com/  cached | more results from this site 3. Nasdaq Stock Market
includes quotes, news, market activity, investor tools, and IPO information.
www.---.com/  cached | more results from this site
↪ More sites about: Stock Exchanges > Nasdaq Stock Market RESULTS: 1 - 20 of about 14,400,000 total results                    next 20 ▶

Web | Directory | News | Yellow Pages | Images NEW!

Search for all of these words [quotes]  and none of these words [ ]  [Search]  Also search in:
Yahoo! Shopping Copyright © 2003 Yahoo! Inc. All rights reserved. Privacy Policy - Terms of Service - Ad Feedback - Search Feedback

FIG. 11

SEARCH PROCESSING WITH AUTOMATIC CATEGORIZATION OF QUERIES

CROSS-REFERENCES TO RELATED APPLICATIONS

The present disclosure is related to the following commonly assigned applications/patents:

U.S. patent application Ser. No. 10/712,307, filed Nov. 12, 2003, entitled "Systems and Methods for Search Query Processing Using Trend Analysis" to Kapur (hereinafter "Kapur I")

U.S. patent application Ser. No. 10/713,576, filed Nov. 12, 2003, entitled "Systems and Methods for Generating Concept Units from Search Queries" to Kapur et al. (hereinafter "Kapur II");

U.S. patent application Ser. No. 10/797,614, filed Mar. 9, 2004, entitled "Systems and Methods for Search Processing Using Superunits" to Kapur et al. (hereinafter "Kapur III");

U.S. patent application Ser. No. 10/818,752, filed Apr. 5, 2004, entitled "Universal Search Interface System and Methods " to (hereinafter "Kapur IV"); and U.S. patent application Ser. No. 11/006,463, filed Dec. 6, 2004, entitled "Automatic Generation of Taxonomies for Categorizing Queries and Search Query Processing Using Taxonomies" to Kapur (hereinafter "Kapur V").

The respective disclosures of these applications/patents are incorporated herein by reference in their entirety for all purposes

BACKGROUND OF THE INVENTION

The present invention relates generally to network and Internet search and interface systems and more particularly to search systems that provide enhanced search functionality including functions wherein search queries are automatically categorized according to one or more taxonomies and wherein taxonomies can be automatically generated from past queries and/or user actions in relation to the queries.

With the advent of the Internet and the multitude of web pages and media content available to a user over the World Wide Web (web), there has become a need to provide users with streamlined approaches to filter and obtain desired information from the web. Search systems and processes have been developed to meet the needs of users to obtain desired information. Examples of such technologies can be accessed through Yahoo!, Google and other sites. Typically, a user inputs a query and a search process returns one or more links (in the case of searching the web), documents and/or references (in the case of a different search corpus) related to the query. The links returned may be closely related, or they may be completely unrelated, to what the user was actually looking for. The "relatedness" of results to the query may be in part a function of the actual query entered as well as the robustness of the search system (underlying collection system) used. Relatedness might be subjectively determined by a user or objectively determined by what a user might have been looking for.

Queries that users enter are typically made up of one or more words. For example, "Hawaii" is a query, so is "New York city", and so is "New York city law enforcement". As such, queries as a whole are not integral to the human brain. In other words, human beings do not naturally think in terms of queries. They are an artificial construct imposed, in part, by the need to query search engines or look up library catalogs. Human beings do not naturally think in terms of just single words either. What human beings think in terms of are natural concepts. For example, "Hawaii" and "New York city" are vastly different queries in terms of length as measured by number of words but they share one important characteristic: they are each made up of one concept. The query "New York city law enforcement" is different, however, because it is made up of two distinct concepts "New York city" and "law enforcement".

Human beings also think in terms of logical relationships between concepts. For example, "law enforcement" and "police" are related concepts since the police are an important agency of law enforcement; a user who types in one of these concepts may be interested in sites related to the other concept even if those sites do not contain the particular word or phrase the user happened to type. As a result of such thinking patterns, human beings by nature build queries by entering one or more natural concepts, not simply a variably long sequence of single words, and the query generally does not include all of the related concepts that the user might be aware of. Also, the user intent is not necessarily reflected in individual words of the query. For instance, "law enforcement" is one concept, while the separate words "law" and "enforcement" do not individually convey the same user intent as the words combined.

Current technologies used by search providers do not understand queries the same way that human beings create them. For instance, existing search engines generally search for the exact words or phrases the user entered, not for the underlying natural concepts or related concepts the user actually had in mind. This is perhaps the most important reason that prevents search providers from identifying a user's intent and providing optimal search results and content.

As can be seen there is a need for improved search and interface technology that aids in providing results that are more in line with the actual concepts in which a user may be interested and a better user experience.

BRIEF SUMMARY OF THE INVENTION

Embodiments of the present invention provide systems and methods for processing search requests, including analyzing received queries in order to provide a more sophisticated understanding of the information being sought. A concept network is generated from a set of queries by parsing the queries into units and defining various relationships between the units, e.g., based on patterns of units that appear together in queries. A number of different concept networks corresponding to different sets of queries (e.g., representing different time periods or different geographic areas) can be generated. From these concept networks, queries can be automatically categorized into categories, or more generally, can be associated with one or more nodes of a taxonomy. The categorization can be used to alter the search results or the presentation of the results to the user.

As an example of alterations of search results or presentation, the presentation might include a list of "suggestions" for related search query terms. As other examples, the corpus searched might vary depending on the category or the ordering or selection of the results to present to the user might vary depending on the category.

In some embodiments, categorization is done using a learned set of query-node pairs where a pair maps a particular query to a particular node in the taxonomy. The learned set might be initialized from a manual indication of which queries go with which nodes and enhanced as more searches are performed. One method of enhancement involves tracking post-query click activity to identify how a category estimate of a query might have varied from an actual category for the query as evidenced by the category of the post-query click activity, e.g., a particular hits of the search results that the user selected following the query.

In some embodiments, categories are known for some units or concepts and queries might contain units or concepts that are known or unknown or known for different categories for different parts of the query. In those cases, a category for the entire query might be inferred from the category or categories of parts of the query.

The following detailed description together with the accompanying drawings will provide a better understanding of the nature and advantages of the present invention.

BRIEF DESCRIPTION OF THE DRAWINGS

FIG. 11 is an illustration of one embodiment of a user interface for entering a search and providing results.

DETAILED DESCRIPTION OF THE INVENTION

I. Overview

A. Network Implementation

Figure 1:
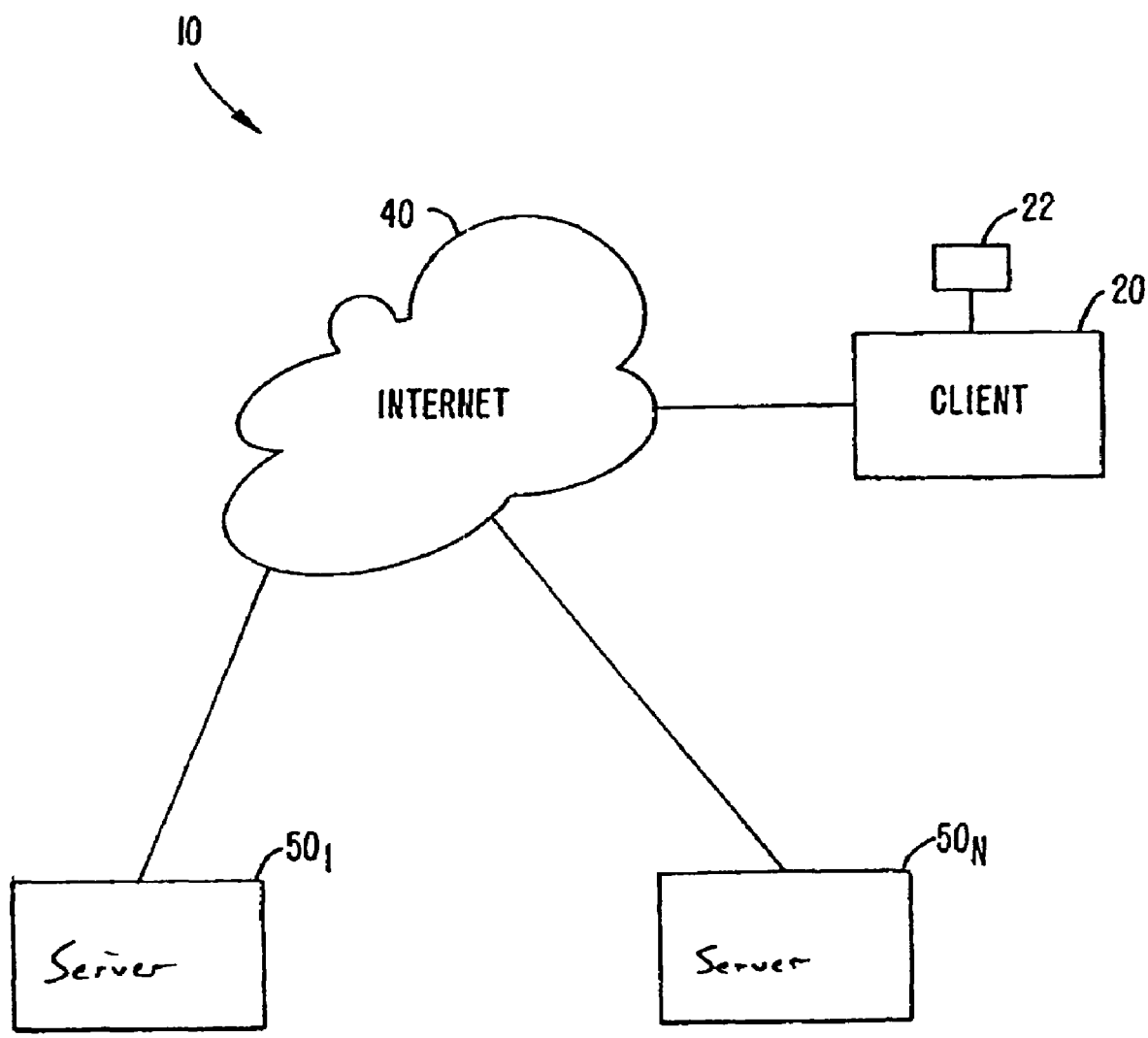
FIG. 1 is a simplified high-level block diagram of an information retrieval and communication system according to an embodiment of the present invention.

FIG. 1 illustrates a general overview of an information retrieval and communication network 10 including a client system 20 according to an embodiment of the present invention. In computer network 10, client system 20 is coupled through the Internet 40, or other communication network, e.g., over any local area network (LAN) or wide area network (WAN) connection, to any number of server systems $50_1$ to $50_N$. As will be described herein, client system 20 is configured according to the present invention to communicate with any of server systems $50_1$ to $50_N$, e.g., to access, receive, retrieve and display media content and other information such as web pages.

Several elements in the system shown in FIG. 1 include conventional, well-known elements that need not be explained in detail here. For example, client system 20 could include a desktop personal computer, workstation, laptop, personal digital assistant (PDA), cell phone, or any WAP-enabled device or any other computing device capable of interfacing directly or indirectly to the Internet. Client system 20 typically runs a browsing program, such as Microsoft's Internet Explorer™ browser, Netscape Navigator™ browser, Mozilla™ browser, Opera™ browser, or a WAP-enabled browser in the case of a cell phone, PDA or other wireless device, or the like, allowing a user of client system 20 to access, process and view information and pages available to it from server systems $50_1$ to $50_N$ over Internet 40. Client system 20 also typically includes one or more user interface devices 22, such as a keyboard, a mouse, touch screen, pen or the like, for interacting with a graphical user interface (GUI) provided by the browser on a display (e.g., monitor screen, LCD display, etc.), in conjunction with pages, forms and other information provided by server systems $50_1$ to $50_N$ or other servers. The present invention is suitable for use with the Internet, which refers to a specific global internetwork of networks. However, it should be understood that other networks can be used instead of or in addition to the Internet, such as an intranet, an extranet, a virtual private network (VPN), a non-TCP/IP based network, any LAN or WAN or the like.

According to one embodiment, client system 20 and all of its components are operator configurable using an application including computer code run using a central processing unit such as an Intel Pentium™ processor, AMD Athlon™ processor, or the like or multiple processors. Computer code for operating and configuring client system 20 to communicate, process and display data and media content as described herein is preferably downloaded and stored on a hard disk, but the entire program code, or portions thereof, may also be stored in any other volatile or non-volatile memory medium or device as is well known, such as a ROM or RAM, or provided on any media capable of storing program code, such as a compact disk (CD) medium, a digital versatile disk (DVD) medium, a floppy disk, and the like. Additionally, the entire program code, or portions thereof, may be transmitted and downloaded from a software source, e.g., from one of server systems $50_1$ to $50_N$ to client system 20 over the Internet, or transmitted over any other network connection (e.g., extranet, VPN, LAN, or other conventional networks) using any communication medium and protocols (e.g., TCP/IP, HTTP, HTTPS, Ethernet, or other conventional media and protocols).

It should be appreciated that computer code for implementing aspects of the present invention can be C, C++, HTML, XML, Java, JavaScript, etc. code, or any other suitable scripting language (e.g., VBScript), or any other suitable programming language that can be executed on client system 20 or compiled to execute on client system 20. In some embodiments, no code is downloaded to client system 20, and needed code is executed by a server, or code already present at client system 20 is executed.

B. Search System

Figure 2:
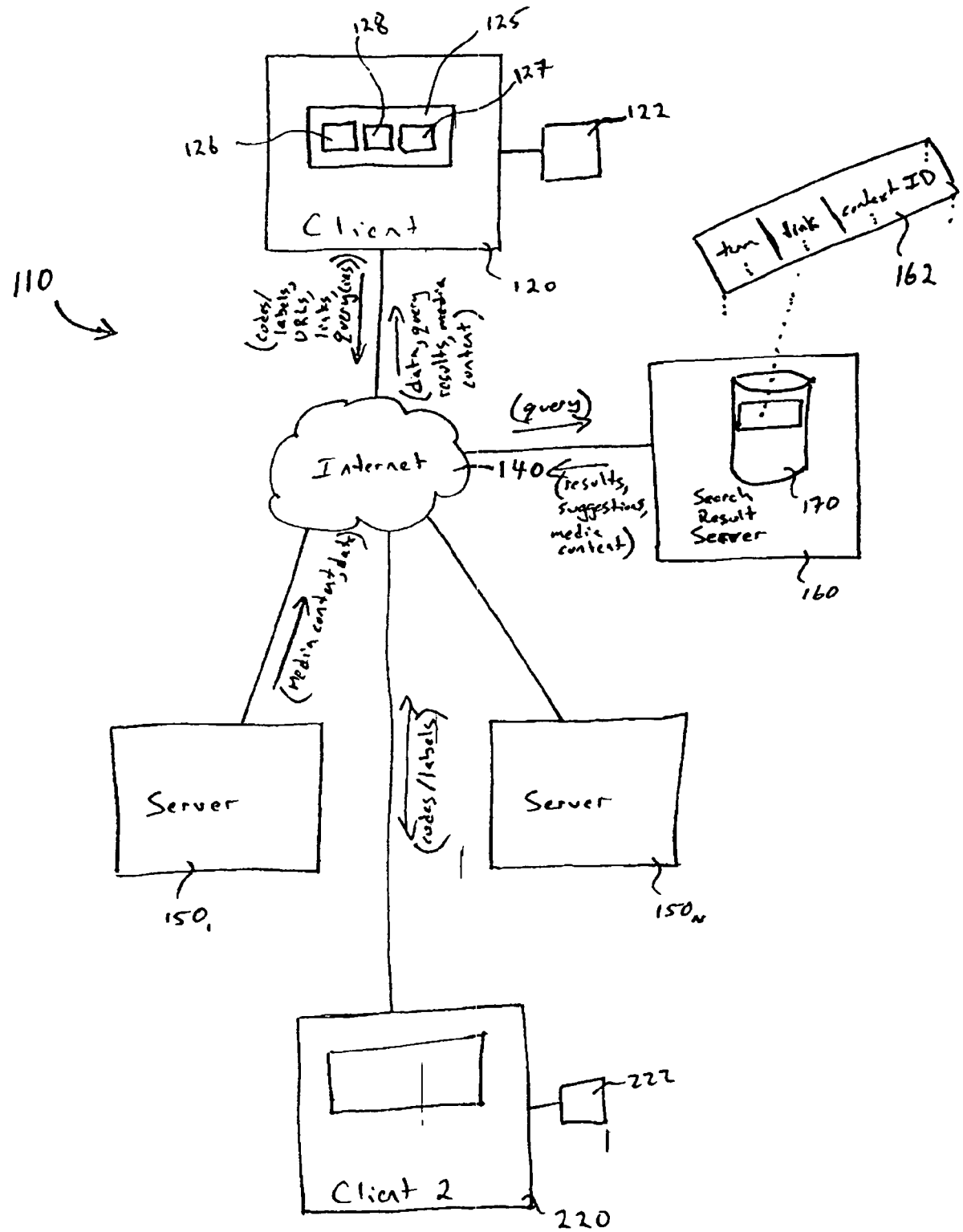
FIG. 2 is a simplified block diagram of an information retrieval and communication network for communicating media content according to an embodiment of the present invention.

FIG. 2 illustrates another information retrieval and communication network 110 for communicating media content according to an embodiment of the invention. As shown, network 110 includes client system 120, one or more content server systems 150, and a search server system 160. In network 110, client system 120 is communicably coupled through Internet 140 or other communication network to server systems 150 and 160. As discussed above, client system 120 and its components are configured to communicate with server systems 150 and 160 and other server systems over the Internet 140 or other communication networks.

According to one embodiment, a client application (represented as module 125) executing on client system 120 includes instructions for controlling client system 120 and its components to communicate with server systems 150 and 160 and to process and display data content received therefrom. Client application 125 can be transmitted and downloaded to client system 120 from a software source such as a remote server system (e.g., server systems 150, server system 160 or other remote server system), although client application module 125 can be provided on any software storage medium such as a floppy disk, CD, DVD, etc., as discussed above. For example, in one aspect, client application module 125 may be provided over the Internet 140 to client system 120 in an HTML wrapper including various controls such as, for example, embedded JavaScript or Active X controls, for manipulating data and rendering data in various objects, frames and windows as will be described later.

Additionally, client application module 125 includes various software modules for processing data and media content, such as a specialized search module 126 for processing search requests and search result data, a user interface module 127 for rendering data and media content in text and data frames and active windows, e.g., browser windows and dialog boxes, and an application interface module 128 for interfacing and communicating with various applications executing on client 120. Examples of various applications executing on client system 120 for which application interface module 128 is preferably configured to interface with according to aspects of the present invention include various e-mail applications, instant messaging (IM) applications, browser applications, document management applications and others. Further, interface module 127 may include a browser, such as a default browser configured on client system 120 or a different browser. In some embodiments, client application module 125 provides features of a universal search interface as described in Kapur IV.

According to one embodiment, server system 160 is configured to provide search result data and media content to client system 120, and server system 150 is configured to provide data and media content such as web pages to client system 120, for example, in response to links selected in search result pages provided by server system 160. As will be described in more detail below, server system 160 in one embodiment references various collection technologies for populating one or more indexes with, for example pages, links to pages, etc. Such collection technologies include automatic web crawlers, spiders, etc., as well as manual or semi-automatic categorization processes and interfaces for categorizing or classifying and ranking web pages within a hierarchical structure such as a taxonomy. In certain aspects, server 160 is also configured with search related algorithms for processing and ranking web pages. Server 160 is also preferably configured to record user query activity in the form of query log files, such as the queries submitted, when they were submitted, who submitted them and what the submitter did after receiving search results.

Search server system 160 in one embodiment references various page indexes 170 that are populated with, e.g., pages, links to pages, data representing the content of indexed pages, etc. Page indexes may be generated by various collection technologies including automatic web crawlers, spiders, etc., as well as manual or semi-automatic categorization processes and interfaces for categorizing or classifying and ranking web pages within a hierarchical structure. These technologies may be implemented on search server system 160 or in a separate system (not shown) that generates a page index 170 and makes it available to search server system 160.

An entry 162 in page index 170 includes a search term, a link (or other encoded identifier) to a page in which that term appears and a context identifier for the page. Additional details of the operation of search server system to obtain search results is provided in Kapur IV.

It will be appreciated that the search system described herein is illustrative and that variations and modifications are possible. The content server and search server system may be part of a single organization, e.g., a distributed server system such as that provided to users by Yahoo! Inc., or they may be part of disparate organizations. Each server system generally includes at least one server and an associated database system, and may include multiple servers and associated database systems, and although shown as a single block, may be geographically distributed. For example, all servers of a search server system may be located in close proximity to one another (e.g., in a server farm located in a single building or campus), or they may be distributed at locations remote from one another (e.g., one or more servers located in city A and one or more servers located in city B). Thus, as used herein, a "server system" typically includes one or more logically and/or physically connected servers distributed locally or across one or more geographic locations; the terms "server" and "server system" are used interchangeably.

The search server system may be configured with one or more page indexes and algorithms for accessing the page index(es) and providing search results to users in response to search queries received from client systems. The search server system might generate the page indexes itself, receive page indexes from another source (e.g., a separate server system), or receive page indexes from another source and perform further processing thereof (e.g., addition or updating of the context identifiers).

In preferred aspects of the present invention, a query processing engine is provided to process queries and decompose queries into constituent units. The query processing engine of the present invention allows for the system to implement concept discovery and analysis processes as well as context analysis, disambiguation and many other processes that would enhance the quality of results returned to a user in response to a search query. A query processing engine according to the present invention may be implemented in a stand alone device or system connected to a network, e.g., a computer system executing various query processing and analysis algorithms and processes as discussed herein, or it may be included as part of a search server such as server system 160, or other server system.

C. Concept Networks

In some embodiments, the concepts within a query are advantageously detected by reference to a unit dictionary 172 that contains a list of known concepts (or "units"). Unit dictionary 172 is advantageously generated by a concept discovery process based on some number (preferably a large number, e.g., at least several hundred thousand) of previous queries. Concept discovery involves analysis of the queries to generate a concept network and may be performed by search server 160 or by another server (not shown).

Figure 3:
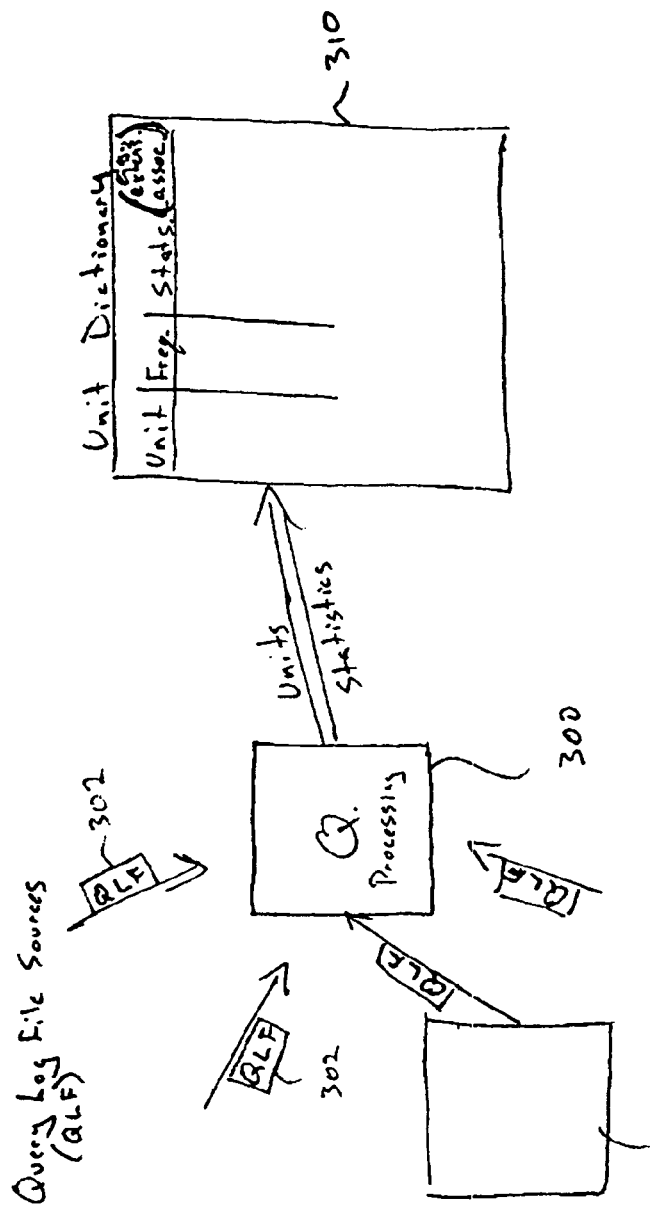
FIG. 3 is a graphical representation of a concept network according to an embodiment of the present invention.

FIG. 3 illustrates a system including a query processing engine. A shown engine 300 receives query log files (or actual queries) from various sources over the Internet or through various network connections, e.g., LAN, WAN, direct links, distribution media (e.g., CD, DVD, floppy), etc. The query log files (query logs) are processed by query engine 300 using statistical methods such as may be used in information theory or concepts such as mutual information. In preferred aspects, daily query logs are used, although logs for different time periods, e.g., hours, weeks, etc. may be used as desired. Query logs typically include actual queries submitted by users, and in some cases additional useful information such as geographic location of querying users, timestamps, IP addresses of client systems, cookies, type of client (e.g., browser type), etc. Query processing engine 300 processes the various query logs and generates units therefrom. The units, and associated statistics such as frequency of occurrence are stored to a memory or database file 310.

Examples of aspects of a query processing engine including methodologies for processing queries and query logs to generate units, and for generating suggestions based on units, is described in Kapur II. Server 160 processes the units and any statistics received from system 180 and returns results responsive to the user's query to the user along with suggestions and other information. In certain aspects, suggestions are a way to involve users in a continuous dialogue with the search system. Suggestions are hints and tips about what the user might want to explore next based on highly sophisticated understanding of user needs as captured in units and their extensions and associations.

Figure 4:
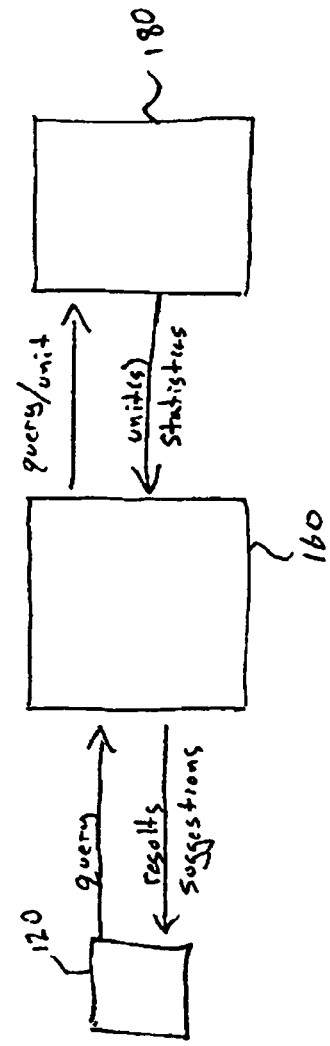
FIG. 4 is a simplified block diagram of a query processing engine according to an embodiment of the present invention.

In one aspect, the unit dictionary 310 is advantageously used to generate suggestions to present to the user in addition to, or in lieu of, actual search results. For example, search server 160 or other search intelligence may send a query to a specialized server, e.g., server 180 of FIG. 4, controlling the unit dictionary, or an instance of the unit dictionary may be stored to search server 160. An example of a methodology for generating suggestions according to one embodiment, for example using extensions and associations defined in the above pseudo-code for generating units, can be found in Kapur II.

In preferred aspects, processes configured to run on subscribing companies' servers, e.g., servers 150, are provided to subscribing companies (e.g., as code on a computer readable medium or transmitted over a network connection) for communicating with server 160. Such processes are preferably always running in the background, providing desired information in response to queries from server 160 identifying pages and or products referenced by the index or as a result of individual searches. Manual information updating may also be implemented, wherein an operator at the company provides the desired information at specified times or upon request from server 160.

Units and Clustering

Figure 5:
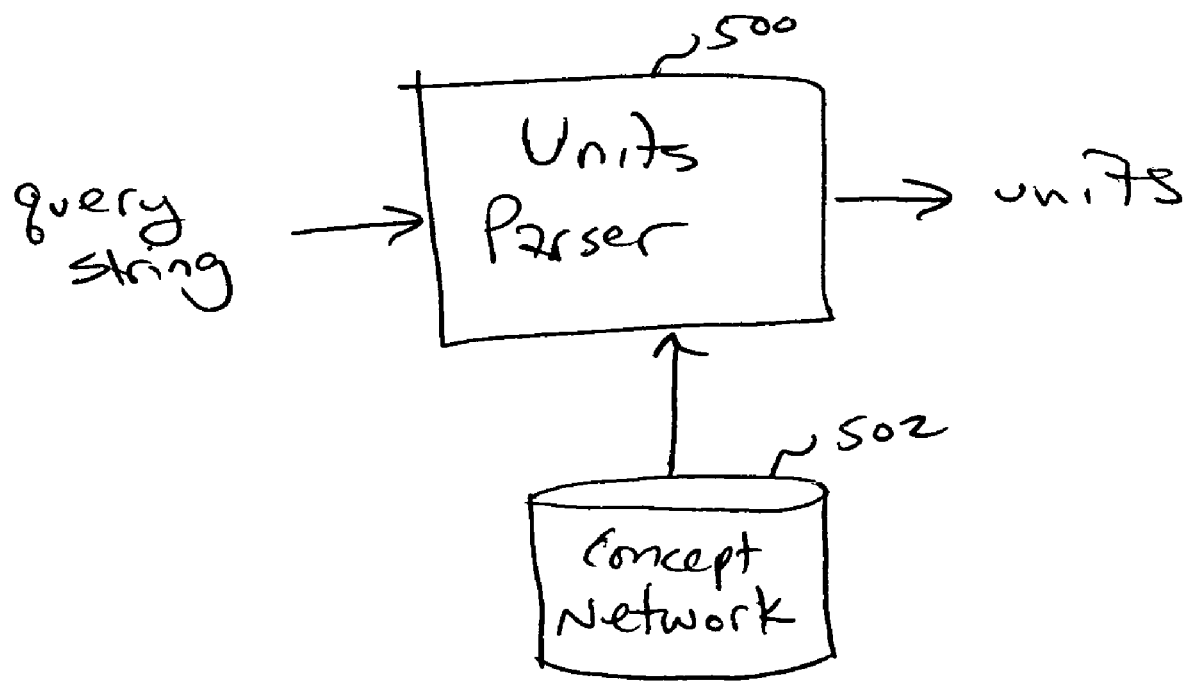
FIG. 5 is a simplified block diagram of a units generator.

FIG. 5 is a simplified block diagram of a units generator. As illustrated there, a units parser 500 accepts as input a query string (or a query record comprising the query string and other data or metadata appurtenant to the query), consults a concept network 502 and outputs one or more units representing concepts at which the query string is directed. Further details of the operation of a units generator is described in Kapur II. The units can be used for forming searches, generating suggestions for related searches, logging, and various other purposes.

One use for units is for clustering user queries to define groups of terms used over the queries. As an example, units can be clustered if they have "similar" associated words. For example, the words "lyrics", "mp3", "guitar tabs", "discography", etc., might co-occur in a large set of queries with a particular guitarist's name. Similar words will be used by users when they query for any other singer. This allows the search system to form clusters based on the associated words with a high accuracy.

Similarity can be defined in several ways. In one approach, similarity between two units is based on the extent of overlap of words with the units. In turn, various algorithms might be used to measure the extent of overlap.

For example, overlap between two units, each having words associated therewith and determined from a collection of queries, could be measured by taking into account one or more of the following factors:

a) the number of associated words that can be found in both units;

b) the frequency of occurrence of the associated words and the number of associated words;

c) the number of associated words, with some matches discounted according to the difference in rank (sorted by frequency) of associated words in a list of suggestions associated with the units;

d) the number of associated words, with some matches discounted according to the difference in relative frequency of associated words;

e) the relevance of the associated words measured by the number of times an associated word occurs with either of the units as compared to the total number of times those words co-occur with other units;

In some empirical tests, factors a) and e) produce good results. Further cluster processing might include context-based clustering. Take, for example, a cluster for the unit "sony" having values as shown in Table 1.

TABLE 1

| Base Unit | Similarity | Confidence of Similarity |
|---|---|---|
| sony: | Panasonic | 45.49 |
|  | Toshiba | 30.61 |
|  | Sharp | 30.40 |
|  | Philips | 29.75 |
|  | JVC | 29.35 |
|  | Samsung | 28.46 |
|  | Pioneer | 26.26 |
|  | Compaq | 24.04 |
|  | Dell | 23.15 |
|  | LG | 22.11 |
|  | Mobile | 21.75 |
|  | RCA | 21.72 |
|  | Reviews | 21.68 |
|  | Mitsubishi | 20.25 |
|  | Wireless | 20.18 |
|  | HP | 20.15 |
|  | tv | 20.12 |
|  | Hitachi | 20.05 |
|  | pc | 20.02 |
|  | Digital | 19.32 |

The "sony" in a query often relates to one of many types of electronics products, so if the query is actually related to computers/desktops/laptops, the system might refine/reorder the results using "sony" in context of some other company say. For example, in the context of "Compaq", the results of table 1 change to those of Table 2.

TABLE 2

| Base Unit | Similarity | Confidence of Similarity |
|---|---|---|
| Sony, compaq: | Dell | 17.86 |
|  | Toshiba | 17.84 |
|  | HP | 15.60 |
|  | IBM | 13.72 |
|  | Panasonic | 13.68 |
|  | Sharp | 12.82 |
|  | Samsung | 12.81 |
|  | laptop | 11.91 |
|  | Canon | 11.78 |
|  | NEC | 11.73 |
|  | Gateway | 10.84 |

TABLE 2-continued

| Base Unit | Similarity | Confidence of Similarity |
|---|---|---|
| | computer | 10.82 |
| | tv | 10.68 |
| | Mac | 10.55 |
| | mobile phone | 9.97 |
| | Mitsubishi | 9.92 |
| | Motorola | 9.76 |
| | ASUS | 9.75 |
| | LG | 9.72 |
| | mobile | 9.69 |

For such context-based clustering, one approach is to use the intersection of the associated words of the given units and make a pseudo-unit that is given to one or more of the factors a-e listed above. Further examples and description of clustering is shown in Kapur III.

Keyword Categorization Using Unit-Clusters

Keyword categorization can be done manually. With such an approach, user queries are manually categorized or classified into a category tree by human editors. The editors need to have a sound knowledge of a query in order to categorize it properly. Manual classification is not always consistent and can be very subjective. In order to avoid these problems, a search support system can help the editors choose the right categories easily and consistently. A search support system might also require automated categorization to handle queries that are not manually categorized.

In one approach described here, when the system receives a query that is not already in the set of categorized queries, the uncategorized query is divided into units. If those units are categorized, then those categories can be used to classify the uncategorized query.

Where the uncategorized query is a unit by itself and cannot be divided, a clustering process, such as one described herein, can be applied to find similar units and their categories. For example, if the given unclassified word is a brand name of television that is not classified, but clustering identifies it as being similar to other television brands, the unit can be classified. Such classification can be a K-Nearest Neighbor classification done with a unique similarity measure, which can be one of the factors.

This approach also can help to classify misspellings and variants because the associated words for all such variants are going to be similar and thus they will fall in the same cluster as the correct spelling.

Automatic Query Categorizer

Figure 6:
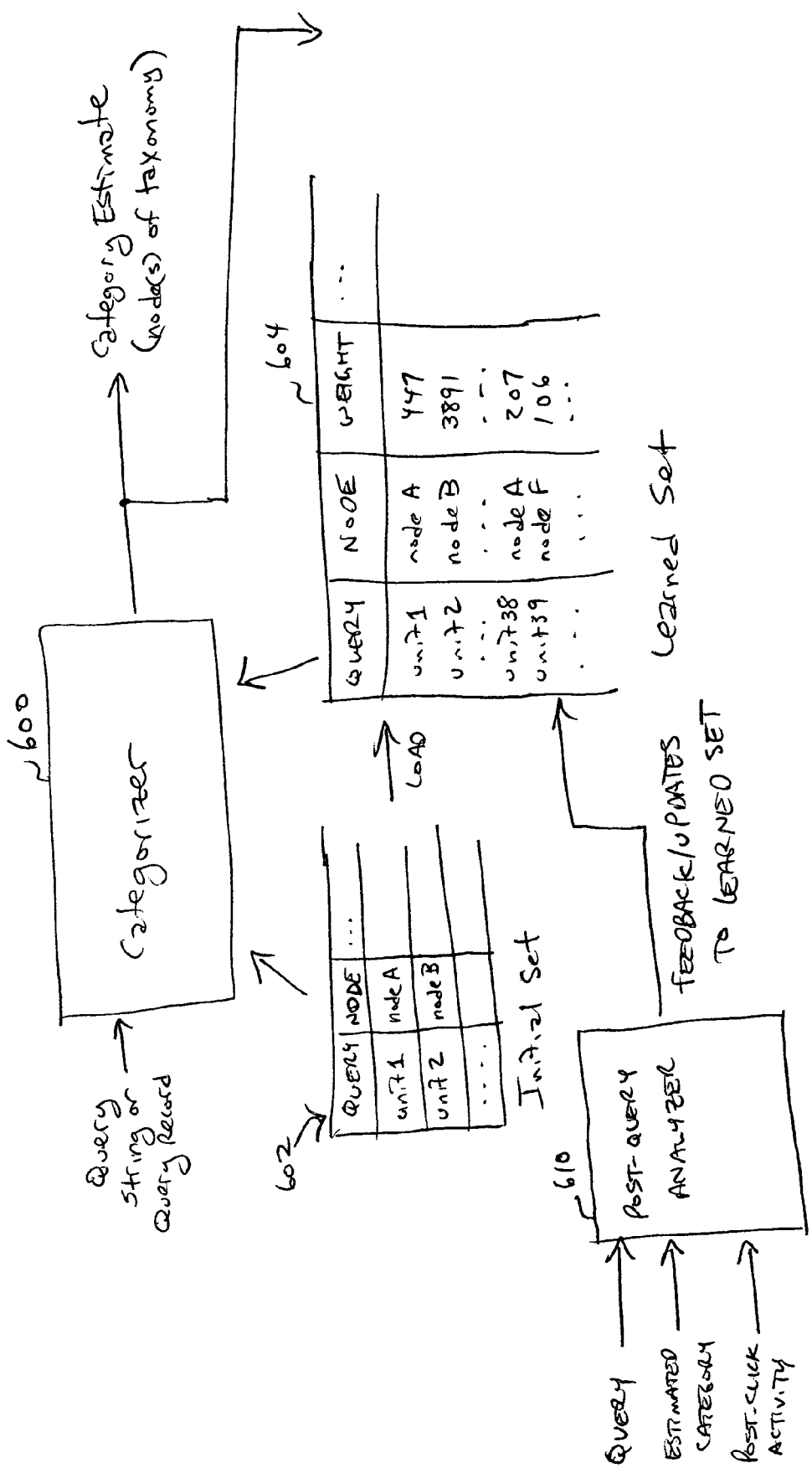
FIG. 6 is a block diagram of an embodiment of an automatic query categorizer.

FIG. 6 is a block diagram of an embodiment of an automatic query categorizer that might use the units determined by a units generator to determine one or more nodes in a taxonomy to which the query is to be associated. As illustrated there, a categorizer 600 receives as input a query, possibly as a query record, and consults a set of query-node pairs. In some cases, categorizer 600 consults with an initial set 602 generated manually or provided to a search system from some other source. For example, initial set 602 might comprise several hundred search queries and the taxonomy node (representing a category) with which the search query is associated. Thus, if a user submits a query that matches one in the initial set, then that query can be categorized to the node listed for the pair, in a straightforward manner. However, for queries that do not match one in the initial set, which might be most queries in systems where millions of different queries are possible, another approach is needed.

A learned set 604 comprises records of query-node pairings, possibly also including metadata about the pairs, such as weights, where learned set 604 is populated with the initial set and then adjusted as queries are submitted to the search system and categories are indicated by external events, such as post-query click activity. In one embodiment, as shown, a post-query analyzer 610 receives as input the query (or query record), the post-query activity associated with the query (such as an indication of the page or pages the user selected from search results presented for that query) and the estimate of the category(ies) of the query as determined by categorizer 600. From these inputs, post-query analyzer 610 calculates updates to the learned set 604.

In some embodiments, post-query analyzer 610 operates as a feedback loop for a neural network. In this manner, the learned set is improved so that categorizer 600 can improve its estimate of the category or categories with which a query should be associated. In other embodiments, post-query analyzer 610 uses other learning systems to improve estimates of categories.

Once a query's categorization to one or more nodes in a taxonomy is known, that information can be used for altering the search process.

Search Engine Using Categorized Queries

Figure 7:
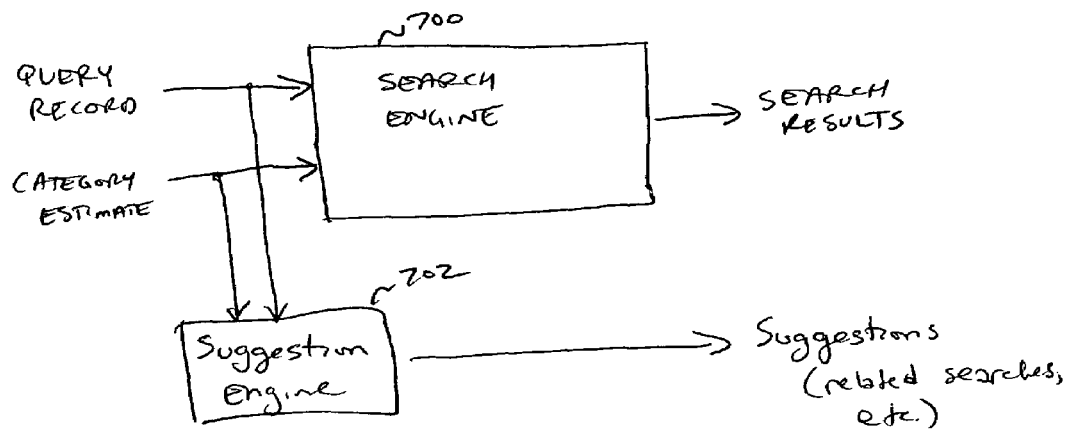
FIG. 7 is a block diagram of an information retrieval and communication system including a search engine that searches according to a query record and an indication of a category for the query.

FIG. 7 is a block diagram of an information retrieval and communication system including a search engine that searches according to a query record and an indication of a category for the query. As illustrated there, a search engine 700 receives as its input a query (or a query record) and a category (possibly an estimate) with which the query is associated and search engine 700 outputs search results accordingly.

The query (or a query record) and category are also input to a suggestion engine 702 that generates a suggestions such as related search queries to be used according to the category or categories of the query. For example, if the query is "find New York hotels", the associated categories might be "Location/USA/New York State/New York City" and "travel/accommodation/hotels". From these categories, the suggestion engine might suggest related searches such as "New York lodgings", "New York travel", "weather in New York", as they are searches associated with nodes that are the same or nearby nodes relative to the original search query.

Figure 8:
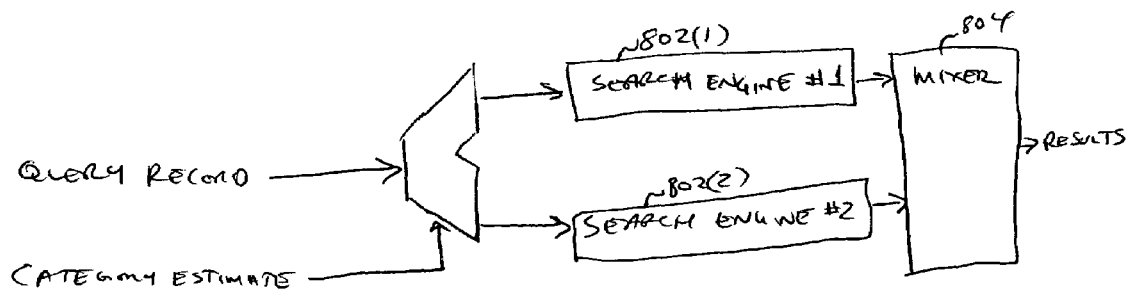
FIG. 8 is a block diagram of an information retrieval and communication system including a query director that directs a query to one or more search engines according to a categorization of the query.

FIG. 8 is a block diagram of an information retrieval and communication system including a query director that directs a query to one or more search engines according to a categorization of the query, so as to alter the search process in another manner. As illustrated there, a query record is provided to a demultiplexer 800 which directs the query record to one or more possible search engines 802 based on a category input to demultiplexer 800. For example, if the category for a query is "health/drug information", the query might be directed to a drug search engine. Although only two search engines are shown, it should be apparent from this disclosure that more than two search engines could be involved. Where the query is presented to more than one search engine, a mixer 804 can combine results from each of the search engines to form global results. In some instances, mixer 804 might take into account weights for each search engine in positioning the results.

Figure 9:
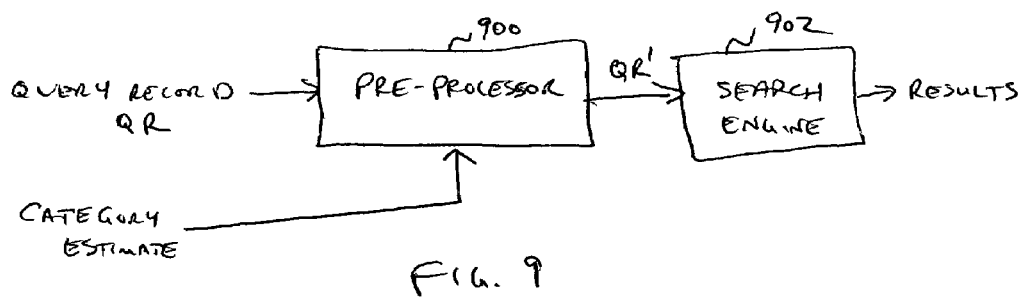
FIG. 9 is a block diagram of an information retrieval and communication system including a preprocessor that modifies a query record according to a categorization of a query referenced in the query record to form a modified query record.
Figure 1:
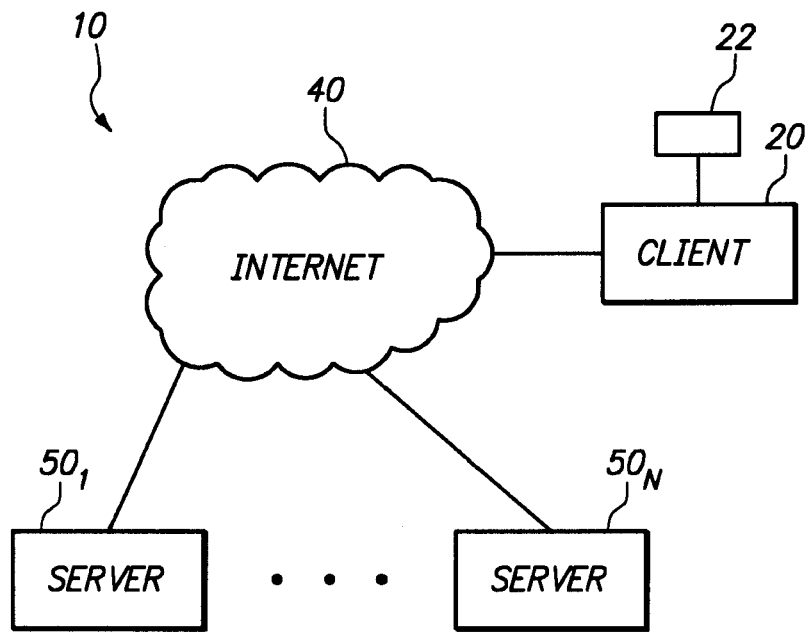
Figure 2:
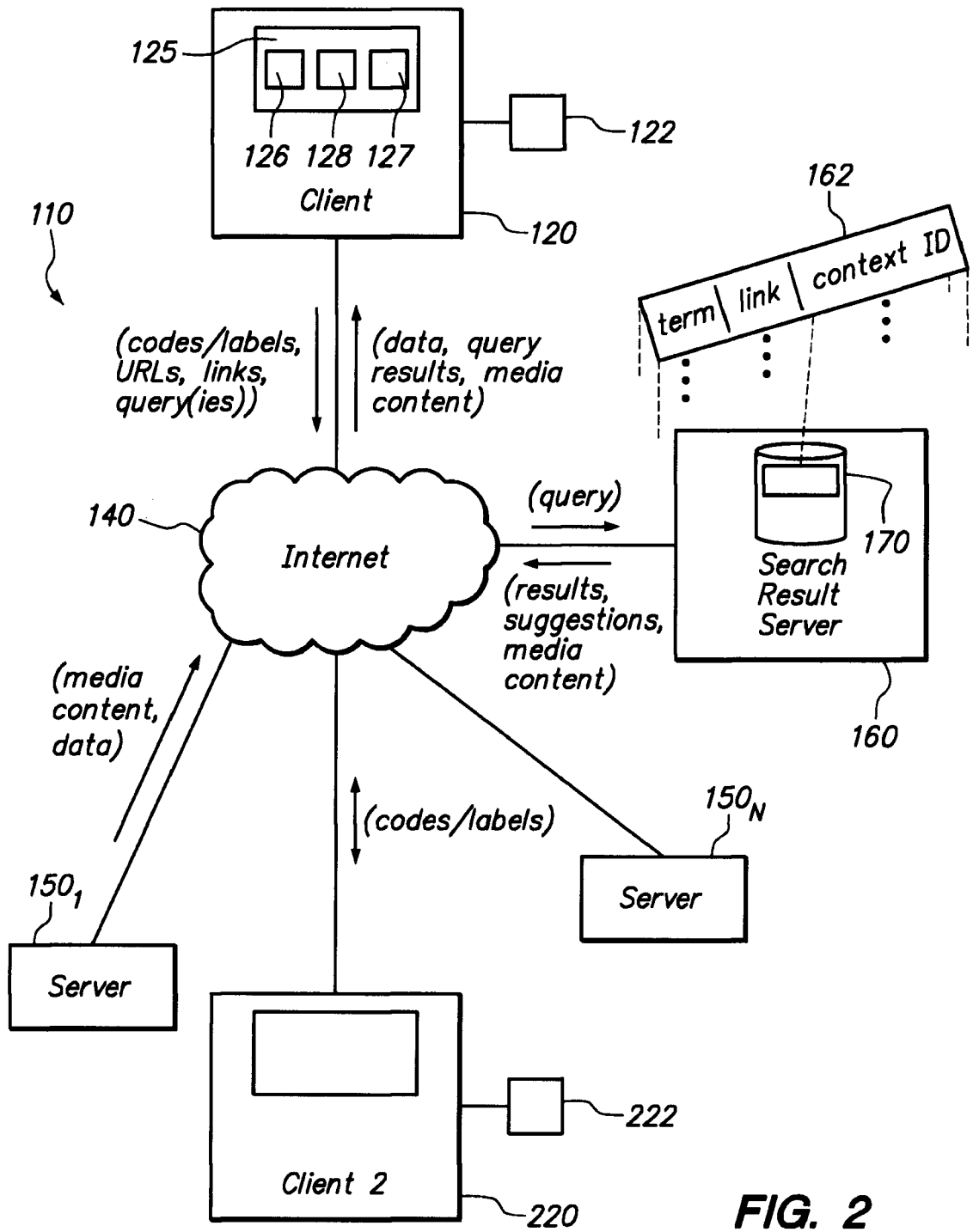
Figure 3:
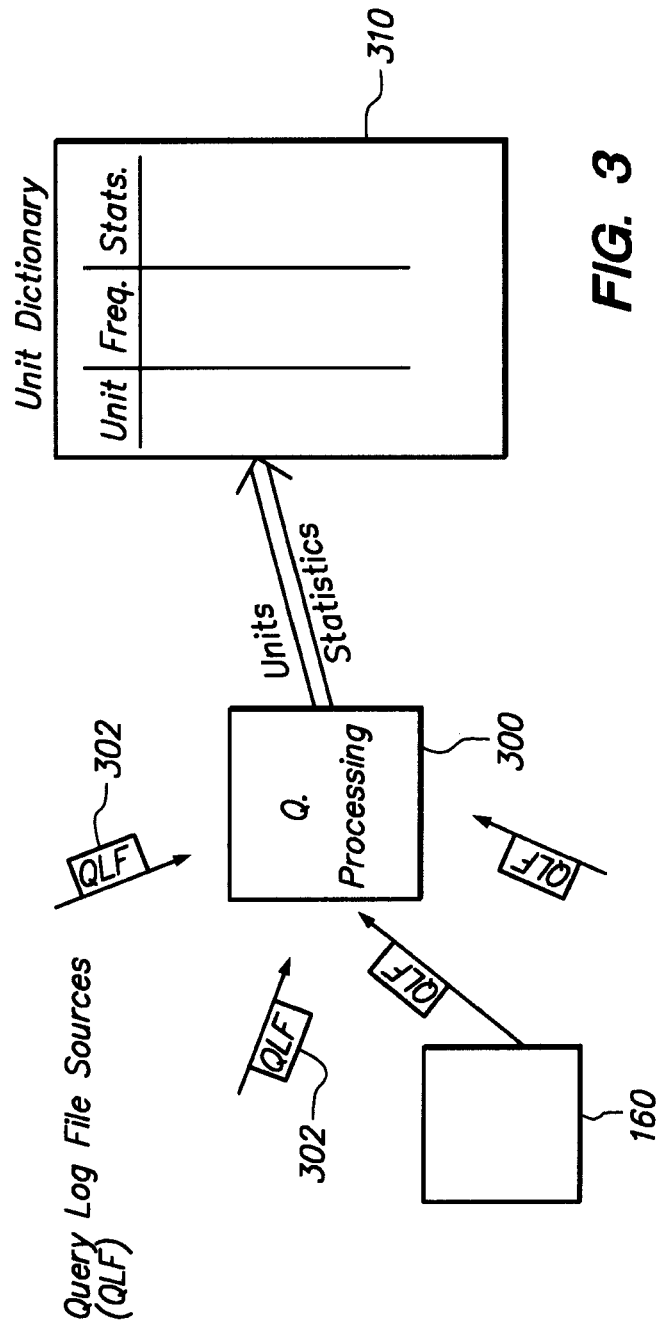
Figure 4:
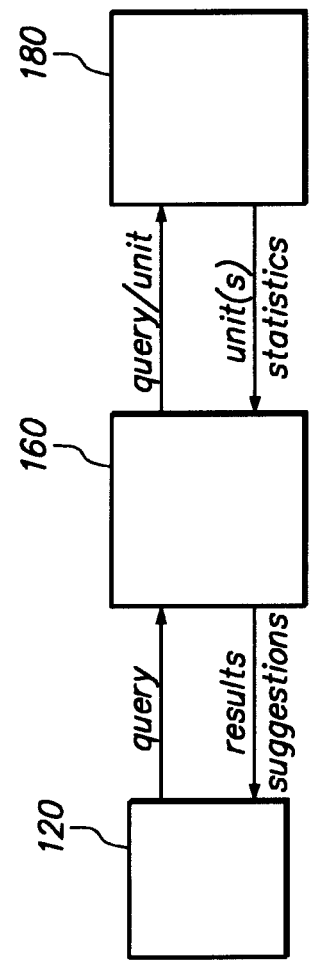
Figure 5:
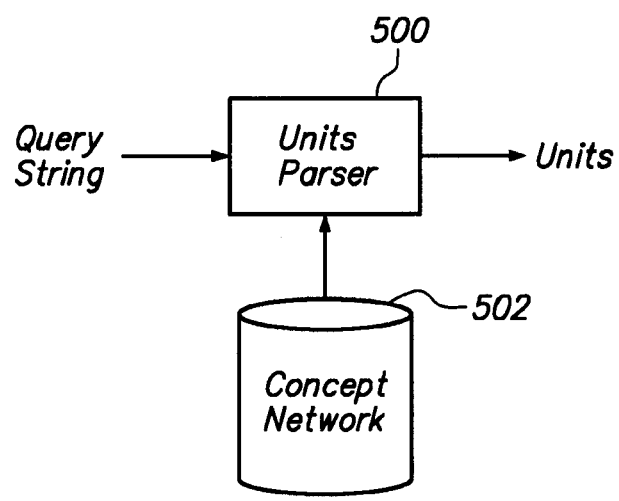
Figure 6:
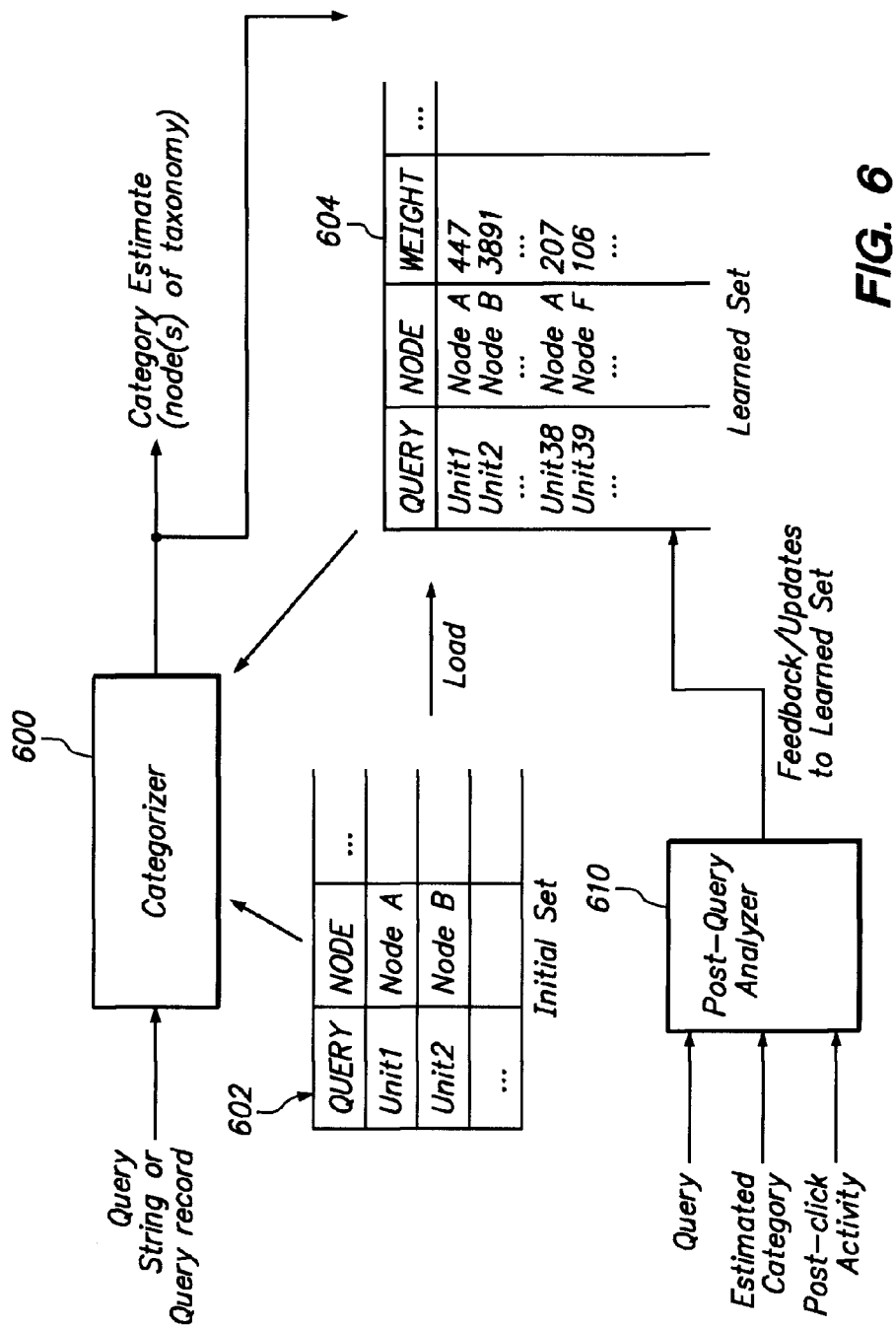
Figure 7:
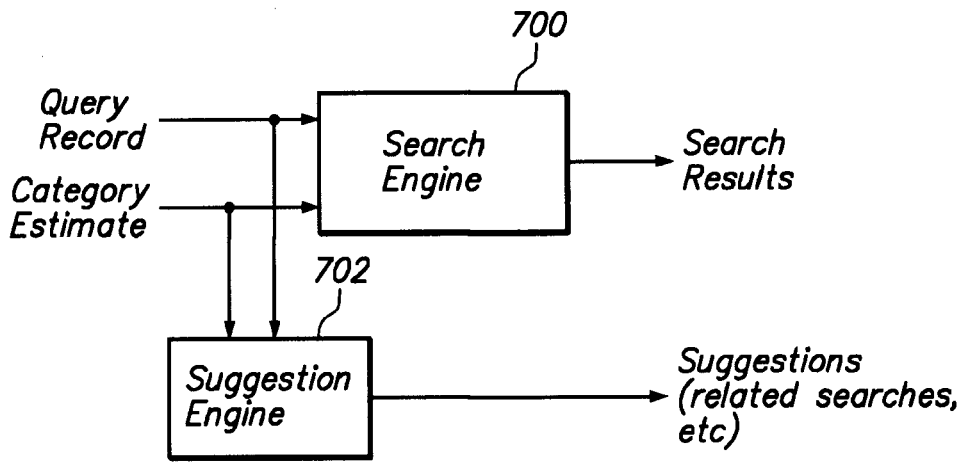
Figure 8:
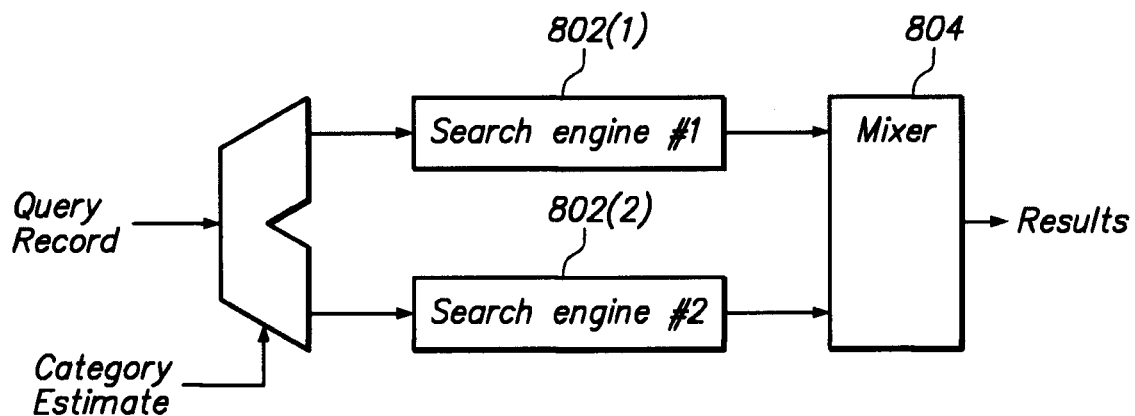
Figure 9:
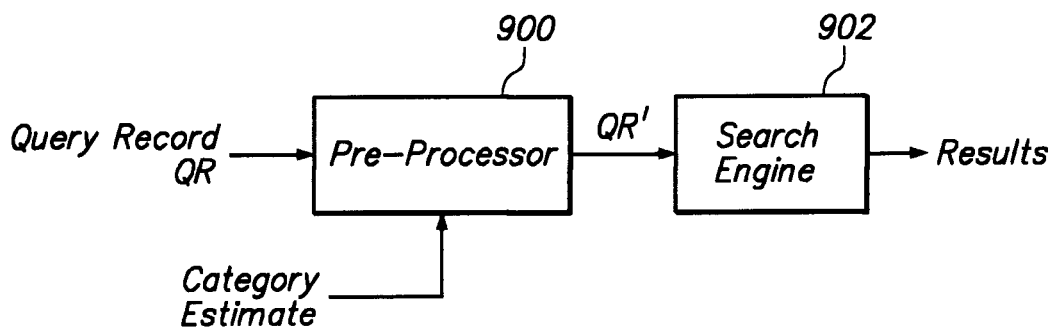

FIG. 9 is a block diagram of an information retrieval and communication system including yet another variation, where a preprocessor modifies a query record according to a categorization of a query referenced in the query record to form a modified query record and that modified query record is submitted to a search engine. In particular, a preprocessor 900 has as its input a query record in an estimated category for the query represented in the query record. Preprocessor 900 outputs a modified query record, which is then submitted to a search engine 902 and results are obtained from that search engine. Preferably, the modifications made to the query embody the information content of the category, either by adding, modifying or deleting words in the query string or by including metadata to guide the operation of search engine 902.

Figure 10:
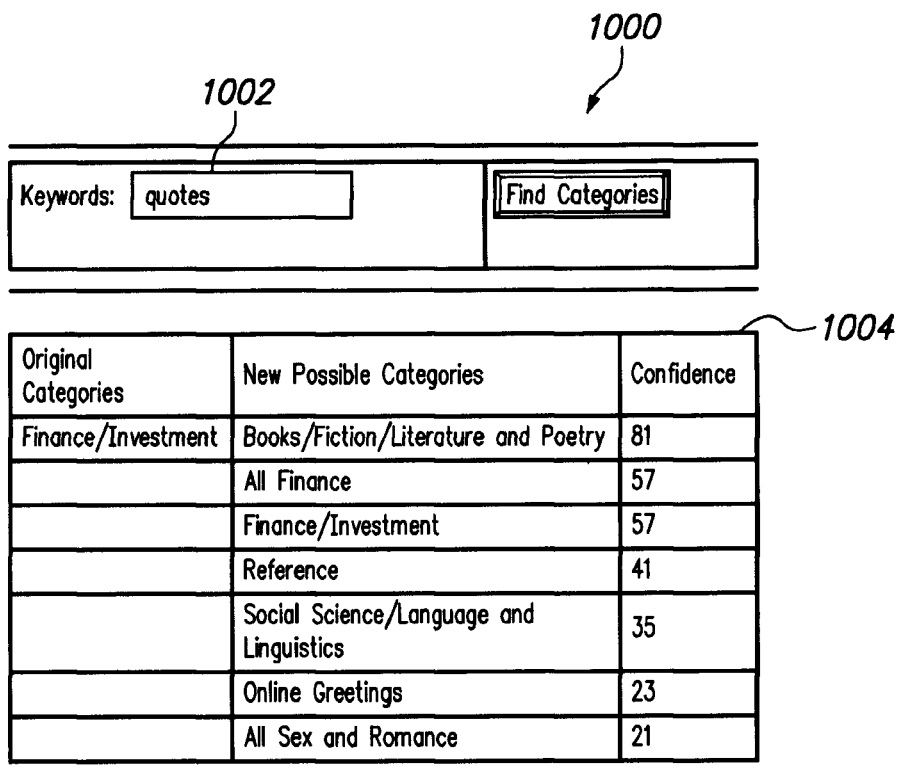
FIG. 10 is an illustration of one embodiment of a user interface to an autocategorization system.

FIG. 10 is an illustration of one embodiment of a user interface 1000 to an autocategorization system. Using this user interface, a keyword or set of keywords (as might be used as a query) can be entered in form field 1002 and the autocategorization system returns a table 1004 showing an original category for the keyword or keywords, new possible categories and a confidence value for each of the new possible categories.

FIG. 11 is an illustration of one embodiment of a user interface 1100 for entering a search and providing results. In its example, the search is "quotes" and the search engine provides an indication of categories for the search, as well as related searches wherein the list of related searches can be derived using categorization information about the entered search. In addition to the category list and the related searches list, the results also include search results which also might be driven using categorization information.

Further Examples

In one example of a system for autocategorization might use a manual categorization from another system for another purpose as its "seed set". For example, a query log of millions of queries often has a relatively few very common queries and a long tail of less common queries. If the test is frequency of occurrence, queries that appear identically more than a threshold number of times (such as 100 times/day, 200 times/day, etc.) might warrant manual categorization to provide a seed set. This way the "most searched" words are categorized easily, and the long tail of words (with lesser hits) are auto-categorized. By automating the search word categorization, considerably more keywords can be categorized, providing for better searches and a useful data set for other purposes.

Keyword categorization might be used by various research and analytical programs, so accuracy of categorization is very important. Since an auto-categorization process that relies on a seed set can work very well but still fail for having bad inputs, the quality of manual categorization used to generate the seed set is also important.

Queries that are made up of a single word can be expected to appear more often than queries made up of multiple words, if for no other reason than there are more combinations of words in multi-word queries. There are some multi-word, single-concept queries, such as "rock concert", but most queries in many real-world systems are made up of more than one concept. For example "hotels in New York" has two concepts: "hotels" (or "hotels in") and "New York" (note that the query has nothing to do with "new" or "York" even though those words are present). Because multi-concept combinations are more numerous than single words, any given single word query can be expected to occur more often than any given multi-concept query. Therefore, if a manual categorization is done on the most frequent queries, the total number of uncategorized queries as well as the number of unique uncategorized queries is likely to favor multi-concept queries. For example, "sports" might appear as a query in a search system more often than "hotels in New York", "hotels in Boston", etc.

As a result, an auto-categorization system should deal with correctly categorizing multi-concept queries if it is to provide a sturdy data set.

One approach to categorizing is to identify the longest concept (in terms of the number of words used), or one of the longest in case of a tie and label that as being the "dominant" concept for the complete query. In the above example, "hotels" would be the dominant concept. The dominant concept would then be used to categorize the complete query. In one embodiment, the category of the complete query is set to the category of the dominant concept.

Various heuristics, such as most-searched-concept and some other rules, can be used to determine the most dominant concept. Of course, totally new queries that have none of their concepts categorized would be done in a different manner, but the above approach might catch a large portion of all queries automatically.

Where even better categorization rates are needed, a number of approaches might be added to the basic autocategorization. For example, a set of rules might be applied to the seed set.

As an example of a rule, the query "hotels in London" might be auto-categorized under "travel & transportation/hotels and lodging", based on the dominant word in the query (in this case, "hotels"). An adjusting rule might be "Pick up the categories of both parts of the query if one concept belonged to 'travel & transportation/hotels & lodging' and the other concept belonged to an international world category". After the application of this rule, the query "hotels in London" would have been categorized under, for example, "travel & transportation/hotels & lodging", "International World/International Europe/International UKIE/London, Travel & transportation/Non US". In that case, the categorization would be complete in that all of the concepts were taken into account.

A set of example rules will now be described. In addition to these "addition" rules, "deletion rules" might be used as well, to help in deleting inappropriate category assignments. Several of these rules operate according to a list of category pairs used by the rule.

1. Union Rules:

With a union rule, a table of relations is considered. If the dominant word/group of words in a given query belongs to one of the two categories in the relation pair and other words in the query belong to the other category of the relation pair, then both categories are included when categorizing the query. Examples of relation pairs are:

(Entertainment/Music, Internet/MP3) (Holidays and Observances, Online Greetings)

For the example query "valentines day e cards" might have as its dominant concept "e cards", so the dominant query categorization would place the query in the category "Online Greetings". However, with the union rule, it would also include the category "Holidays and ObservancesNalentine's day" (note that a spelling error can be dealt with using a concept network). With these two categories, the autocategorization for that query is complete.

2. Category Couples Rules

If the dominant word or group of words belong to the first category of a category couple pair, the second category of the category couple pair is included while auto-categorizing the query. This rule helps when the manual categorization in the seed set does not include examples of queries wherein the dominant word or group of words includes the second category. Examples of category couple pairs are:

> (Luxury Goods/Apparel/Mens, Apparel/Mens)
> (Luxury Goods/Apparel/Womens, Apparel/Womens)

For example, suppose the query is "Brand X.com" is the query and "Brand X" was manually categorized in the category "Online Community/Email", because the category "Services/Email/Brand X" did not exist when the manual categorization was done. With the categorization couples rule, the categorization of "Brand X.com" is complete.

3. Dominant Categories

If the query contains two words or group of words that belong to distinct categories, both categories appear in a dominant categories pair, and the second category of the pair is otherwise the dominant category, make the first category of the pair the dominant category over the second category and exclude the second category when auto-categorizing the query. Examples of dominant category pairs are:

> (Toys/Games, Travel and Transportation/Maps) (Online Community/Games, Travel and Transportation/Maps) (Sports, Education/College and University)

In this example, the query "college football" would normally be parsed with "college" being the dominant concept, and thus assigned to the category "Education/College and University". While the concept "football" would be categorized under "Sports", it is not the dominant concept. However, with the added dominant categories rule, since the dominant categories pair (Sports, Education/College and University) is present, the query is then categorized as a query relating to "Sports". The dominant categories rule is useful where two concepts might be present and one dominant, but for certain pairs of concepts that fall into particular pairs of categories, the category that should be dominant is the one related to the nondominant concept.

4. Replace Words Rules

There are certain categories that are used for specific purposes. The replace word rule also operates on a table of pairs. If the dominant concept belongs in a particular category that is identified with the first category of the pair, then replace the words corresponding to the dominant concept with the words of the second item in the pair.

5. Replace Single Category Rules

A replace single category rule would operate, according to a table of pairs, to replace categories. If the dominant concept belongs in a particular category that is identified with the first category of the pair, then replace the first category with the second category in the pair. For example, for the query "tennessee rivals online", the concept "tennessee rivals" would have a category of "Custom Fusion/College Football", then replace that category with the "Sports/Football" category while auto-categorizing the new query. Examples of entries in a table of pairs for this rule are provided here:

> (Custom Fusion/College Football, Sports/Football)
> (Custom Fusion/Bob Dylan, Entertainment/Music/Rock) (Custom Fusion/Buzz/Personals, Sex and Romance/Personals)

6. Refine Rules

With a refine rule, if after a first level of autocategorization, the query has two categories that are the first two categories of one of the triples listed in a refine rules table, replace the second category with the third category in the triple. For example, consider the refine rules table entries:

> (Entertainment/Movies, Entertainment/Music, Entertainment/Music/Shows and Movies)

With the query "film music", the concept "film" is categorized in "Entertainment/Movies" and the concept "music" is categorized in "Entertainment/Music". Applying the refine rules, the first two categories are found paired in a refine rules table entry (shown above), so the category "Entertainment/Music" (the second item in the triple) is replaced with "Entertainment/Music/Shows and Movies" so that after applying the rule, the query "film music" is categorized in "Entertainment/Movies" and "Entertainment/Music/Shows and Movies".

More rules can be added to these rule files as needed, for varying results. Where more than one taxonomy is used, the rules and rule tables can be global for all taxonomies used, or separate rules and rule tables can be present for different taxonomies. In some embodiment, the rules and/or rules tables are generated semi-automatically, such as by processing queries in a query log to improve a categorization process or accuracy.

Dominant Concepts

Various methods can be used to identify a dominant concept among multiple concepts extracted from a query. A concept can be a unit or, in some cases, can be a collection of units where the collection is of a known category but the categories of the individual units is not known. For example, consider the query "luxurious furniture in miami". Suppose the category for the unit "furniture" is known and the category for the unit "miami" is also known. Suppose further that "luxurious furniture" is a unit, but its category is not known. In that case, the unit "luxurious furniture" can be deemed to not be a known concept and the categorization proceeds with the other words as concepts. If a seed set is used to categorize units, a units-to-category mapping can be used as the seed set for the categorizer.

Some rules for automatically determining the dominant unit might include removing stopwords, considering unit frequency and query frequency, considering ambiguity metrics and applying category-based rules for determining dominant concepts.

Stopwords can be removed from a query before determination of dominant concept, as they normally should not be the dominant concept in the query.

Unit frequency is the frequency of a unit occurring in queries, either as the sole unit or in combination with other units. Query frequency for the given unit is the frequency of the given unit occurring as the only unit of the query. By assessing these ratios, a dominant concept might be uncovered.

Intuitively, if a word is used too often with other words then it is probably not a standalone concept and typically needs a refinement to make its sense clearer. An example of this is the query "cheap furniture". The words "cheap" and "furniture" can be concepts, but the ratio of the query frequency to the unit frequency of "cheap" is low because it does not appear all by itself very often in queries. Compared to the query/unit frequency of "furniture", which can be expected to be higher than the ratio for "cheap", "furniture" would be deemed the dominant concept.

If the query/unit ratio is not available, such as where units and concepts are not synonymous, the system just compare the query frequencies of two or more units and assign dominant concept status to the more frequent concept (which is not a unit).

Ambiguity metrics might also be taken into account. Ambiguity of a concept might be determined from the seed set. For example, consider a seed set of 200,000 keywords and queries categorized. The queries can be processed to identify the units therein. For each unit, the system can examine how many different categories that unit has been assigned to. Ambiguity can then be a measure of the number of different categories, as more ambiguous units would appear in more categories in the seed set. For example, if "jaguar cars" and "jaguar animal" are two categorized queries in the seed set, their categories would be different: "Automobiles" and "Animals", respectively. If the units in these two queries are "jaguar", "car" and "animal", then "jaguar" will appear in two different categories and will be considered more ambiguous as compared to "car" and "animal", which have one category each. More ambiguous units might be less dominant.

Category based rules might also be used. For example, a rule might be used where concepts from certain categories are not considered dominant unless there are no other categorized concepts. For example, locations are typically used to narrow a search, such as the two queries "furniture in miami" and "attractions in miami" where "miami" is used as a domain restricting word and the actual category of the whole queries will depend on the other concepts ("attractions" and "furniture") in the query. Thus, a rule might be used such that concepts that are categorized as locations or other domain restricting concepts are not used as dominant concepts unless they are the only concept.

Refinements

Where none of the units of a query have been categorized, a strategy similar to the ambiguity metrics usages described above might be used to dynamically categorize unknown units/queries. For example, if a unit A is not categorized independently but has occurred mostly in categorized queries belonging to a category C, then A can be assigned to category C. In some variations, a confidence factor hat depends on the number of times the unit has occurred in a particular category might be taken into account.

In some variations, the entire seed set or part of the seed set can be generated automatically instead of manually. Two examples are described below, but it should be understood that other methods of automatically generating a seed set might be used.

In a first example, a query log is examined across a plurality of entry points. A portal might have a plurality of entry points if the portal is organized into a plurality of properties and pages associated with each of the properties have search interfaces. For example, but not by way of limitation, the Yahoo! portal provides access to a plurality of properties, such as Yahoo! Maps, Yahoo! Sports, Yahoo! Travel, Yahoo! Shopping, etc. Each of these properties can have a search capability, such as might be provided by a search box on a property page.

In generating the seed set, the queries for some period of time or other grouping are collected and the entry point at which the query was entered is noted. For example, if "New York" is entered as a query in a search box on a Yahoo! Travel page, that would be noted and that search for "New York" would be associated with travel and when "New York" is entered in a search box on a Yahoo! Sports page, that search would be associated with sports. Some properties might have multiple pages at which a search can be entered and each entry point can be treated separately, all entry points for a property can be grouped indistinctly together, or some variation between those two. In any case, for all (or at least nearly all) of the entry points, a category is known. For example, if the entry point is on a page showing a user's selected stocks and their current quotes, the category for the entry point can clearly be determined. In any case, where a category is not already known for an entry point, it can be manually assigned, as one might expect even a large portal to have no more than hundreds of entry points, which is more manageable than manually categorizing millions of queries.

Concept networks are generated for the various entry points, using techniques described herein or in related patent applications, or yet other techniques. Having the concept networks, a union of units generated over all entry points can be analyzed by unit. If the i-th unit is represented by u[i] and the entry points are represented by e1, e2, e3, . . . , then f(u[i], e[j]) is the frequency of u[i] at entry point e[j] over the set of queries being analyzed. For example, one day's worth of queries might be analyzed, or the first 20 million queries from some time might be analyzed. Let Q(e[j]) be the total number of queries in the set of queries being analyzed that are associated with the j-th entry point.

For each combination of a unit and an entry point, a normalized weight can be calculated as shown in Equation 1. The scale and precision of the weights might be adjusted for easier manipulation, viewing and storage of the numbers, such as multiplying by 1,000,000 or some other scale factor, typically corresponding to the number of queries in the set of queries being analyzed.

$$w(u[i],e[j])=f(u[i],e[j])*(Q(e[j])/1000000) \qquad \text{(Equ. 1)}$$

Where a unit was never found with a given entry point in the set of queries, its weight can be set to zero. Using the weights for a given unit in each of the entry points, the entry points can be ranked in decreasing order of weight for the unit. This ordered set containing the union of units across all entry points and their calculated weights can serve as seed set.

In another approach, queries are logged with or without entry point information, but the log includes an indication of the next action a user takes. If the possible next actions are determined and their categorizations are known or can be automatically determined, then those can be used as a seed set. For example, if a portal shows directory matches along with search results, a user action of clicking on one of the directory matches can cause that directory entry can be associated with the query.

For example, suppose a user enters a search query Q and gets a set of search results and directory category matches displayed. Each of the directory categories are identified by category space identifiers, cs1, cs2, cs3, etc. Web sites present in the directory might be identified by site space identifiers, ss1, ss2, ss3, etc. When a user clicks on a category space identifier or a site space identifier, that action is logged. These "click logs" can then be used to map queries to directory categories. Both of these sets of identifiers need not be non-empty. For example, the site space identifiers might not be used or the category space identifiers might not be used.

For query Q, if a user querying with that query clicks on a category space identifier cs1 and that category space identifier is known to belong to a category c1, the query Q can be mapped to category c1. Another user also using query Q might click on a site space identifier ss2. If that space identifier is a child of (i.e., filed in) directory of category c2, then query Q can be mapped to category c2. Each mapping of query to category can have a weight associated with it. This weight for a query Q and a category C might be proportional to the number of users that, following a query of Q, clicked on a category space identifier associated with category C or one of the child entries associated with category C. In this manner, query q can be auto-categorized with a confidence indicated by the weight. This set of mappings can be used as the seed set.

Confidence measures might be taken into account where confidence measures for a categorization are dependent on the seed set. If the seed set has a confidence measure associated with the categories, then confidence can be assigned to each categorized query. For manually generated seed sets, the confidence might be higher than for automatically generated seed sets, but that does not need to be the case. To improve accuracy, the system might decide to ignore some auto-categorized queries that have low confidence levels.

While the invention has been described with respect to specific embodiments, one skilled in the art will recognize that numerous modifications are possible. In some embodiments, queries may be processed as they are received so that concept network data for one or more concept networks is updated substantially in real time. The automated systems and methods described herein may be augmented or supplemented with human review of all or part of the resulting unit dictionary, including the units, relationships, taxonomies and the like.

The embodiments described herein may make reference to web sites, links, and other terminology specific to instances where the World Wide Web (or a subset thereof) serves as the search corpus. It should be understood that the systems and processes described herein can be adapted for use with a different search corpus (such as an electronic database or document repository) and that results may include content as well as links or references to locations where content may be found.

Thus, although the invention has been described with respect to specific embodiments, it will be appreciated that the invention is intended to cover all modifications and equivalents within the scope of the following claims.

What is claimed is:

1. A method for classifying a current query, comprising the steps of:
   receiving a current query comprising two or more terms;
   determining whether said current query does not match any single, previously submitted query in a set of previously submitted queries by determining that none of the two or more terms in said current query matches terms of any single previously submitted query;
   if said current query does not match any single, previously submitted query in the set of previously submitted queries, then performing the steps of:
      dividing said current query into two or more units;
      performing a comparison between the two or more units and a plurality of categorized units;
      determining two or more categories for said current query based on said comparison;
      in response to determining the two or more categories for said current query based on said comparison, creating a new category as a union of the two or more categories, and storing, in one of volatile memory and non-volatile memory, data that indicates the new category determined for said current query; and
   wherein the method is performed by one or more computing devices.

2. The method of claim 1, further comprising determining search results for said current query based, at least in part, on said one or more categories and the new category.

3. The method of claim 1, wherein said one or more units are determined by a unit generator that makes an association of nodes from a taxonomy to said one or more units, wherein said taxonomy is associated with said current query and any node from said taxonomy represents a category.

4. The method of claim 3, wherein said association of nodes to said one or more units comprises a mapping of units to nodes, wherein said units are from said one or more units and said nodes are from said taxonomy.

5. A method for classifying a current query, comprising the steps of:
   receiving a current query comprising two or more terms;
   determining whether said current query does not match any previously submitted categorized query in a set of previously submitted categorized queries by determining that none of the two or more terms in said current query matches terms of any previously submitted categorized query;
   if said current query does not match any categorized query in a set of the previously submitted categorized queries, then performing the steps of:
      dividing said current query into two or more units;
      performing a comparison between the two or more units and a plurality of categorized units;
      determining two or more categories for said current query based on said comparison;
      in response to determining the two or more categories for said current query based on said comparison, creating a new category as a union of the two or more categories, and storing, in one of volatile memory and non-volatile memory, data that indicates the new category determined for said current query;
   receiving a second query;
   determining whether said second query matches any previously submitted categorized query in the set of previously submitted categorized queries and whether said second query is a single unit;
   responsive to determining that said second query does not match any previously submitted categorized query in the set of previously submitted categorized queries and said second query is a single unit, applying a clustering process to said second query to find similar categorized units;
   storing, in the one of volatile memory and non-volatile memory, data that indicates the similar categorized units for said second query; and
   wherein the method is performed by one or more computing devices.

* * * * *

UNITED STATES PATENT AND TRADEMARK OFFICE
CERTIFICATE OF CORRECTION

| | |
|---|---|
| PATENT NO. | : 7,620,628 B2 |
| APPLICATION NO. | : 11/006466 |
| DATED | : November 17, 2009 |
| INVENTOR(S) | : Shyam Kapur et al. |

It is certified that error appears in the above-identified patent and that said Letters Patent is hereby corrected as shown below:

The Title Page showing an illustration figure should be deleted and substitute therefore the attached Title Page.

Delete Drawing sheets 1-8 and substitute therefore the Drawing sheets consisting of Figs. 1-11 as shown on the attached pages.

Signed and Sealed this

Sixteenth Day of February, 2010

David J. Kappos
*Director of the United States Patent and Trademark Office*

(12) United States Patent
Kapur et al.

(10) Patent No.: US 7,620,628 B2
(45) Date of Patent: Nov. 17, 2009

(54) SEARCH PROCESSING WITH AUTOMATIC CATEGORIZATION OF QUERIES

(75) Inventors: Shyam Kapur, Sunnyvale, CA (US); Jignashu Parikh, Jamnagar (IN); Deepa Joshi, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 378 days.

(21) Appl. No.: 11/006,466

(22) Filed: Dec. 6, 2004

(65) Prior Publication Data
US 2006/0122979 A1   Jun. 8, 2006

(51) Int. Cl.
*G06F 17/30* (2006.01)
(52) U.S. Cl. ............................ 707/4; 707/6
(58) Field of Classification Search ............. 707/3, 707/6, 100, 104.1, 4
See application file for complete search history.

(56) References Cited
U.S. PATENT DOCUMENTS
6,424,973 B1   7/2002   Baclawski
(Continued)

FOREIGN PATENT DOCUMENTS
WO   WO 02/19147 A1   3/2002

OTHER PUBLICATIONS

Ipeirotis et al., "Probe, count, and classify: categorizing hidden web databases", Proceedings of the 2001 ACM SIGMOD international conference on Management of data , p. 67-78, May 2001. Retrived from the Internet: < URL: http://portal.acm.org/ft_gateway.cfm?id=375671&type=pdf&coll=ACM&dl=ACM&CFID=48417025&CFTOKEN=19109216>.*

(Continued)

*Primary Examiner*—John E Breene
*Assistant Examiner*—Dennis Myint
(74) *Attorney, Agent, or Firm*—Hickman, Palermo, Truong & Becker LLP

(57) ABSTRACT

Search results are processed using search requests, including analyzing received queries in order to provide a more sophisticated understanding of the information being sought. A concept network is generated from a set of queries by parsing the queries into units and defining various relationships between the units. From these concept networks, queries can be automatically categorized into categories, or more generally, can be associated with one or more nodes of a taxonomy. The categorization can be used to alter the search results or the presentation of the results to the user. As an example of alterations of search results or presentation, the presentation might include a list of "suggestions" for related search query terms. As other examples, the corpus searched might vary depending on the category or the ordering or selection of the results to present to the user might vary depending on the category. Categorization might be done using a learned set of query-node pairs where a pair maps a particular query to a particular node in the taxonomy. The learned set might be initialized from a manual indication of which queries go with which nodes and enhanced has more searches are performed. One method of enhancement involves tracking post-query click activity to identify how a category estimate of a query might have varied from an actual category for the query as evidenced by the category of the post-query click activity, e.g., a particular hits of the search results that the user selected following the query. Another method involved determining relationships between units in the form of clusters and using clustering to modify the query-node pairs.

5 Claims, 8 Drawing Sheets

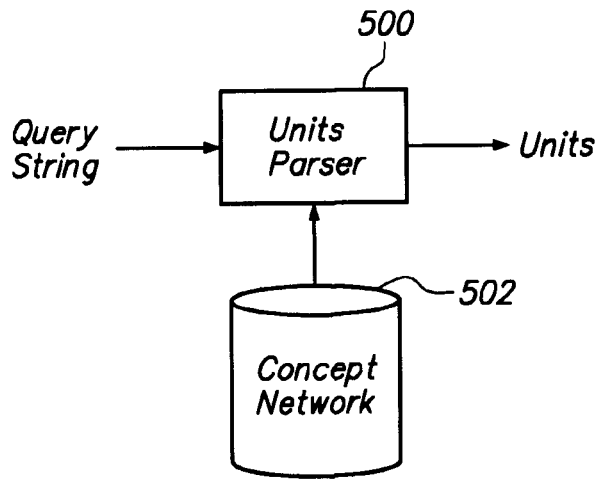

1100

YAHOO! search    Search Home – Yahoo! – Help

Your Search: [quotes]  [Search]
Related: love quotes, famous quotes, movie quotes, funny quotes, More...

[Web]  Directory  News  Yellow Pages  Images    What's New | Send Feedback

INSIDE YAHOO!
Quotations: find Quotes at Yahoo! Reference
Categories: •Financial Quotes •Quotations •Currency Exchange Rates •More...
SPONSOR RESULTS (What's this?) (Become a Sponsor)

• Mortgage Quotes – Click Here – mortgages: Fill out our form online and get mortgage quotes.

TOP 20 WEB RESULTS out of about 14,400,000

1. Bartlett's Familiar Quotations
passages, phrases, and proverbs traced to their sources.
www.----.edu/---- cached | ↘More sites about: Quotations 2. Yahoo! Finance
Real-Time Package Live streaming quotes. Business News. ...My Recent Quotes.
Symbol, Name, Last, Change, ...
quote.yahoo.com/ cached | more results from this site 3. Nasdaq Stock Market
includes quotes, news, market activity, investor tools, and IPO information.
www.---.com/ cached | more results from this site
↘More sites about: Stock Exchanges > Nasdaq Stock Market RESULTS: 1 – 20 of about 14,400,000 total results    next 20 ▷

[Web]  Directory  News  Yellow Pages  Images NEW!

Search for all of these words: [quotes] and none of these words: [   ]  [Search]  Also search in:
Yahoo! Shopping Copyright 2003 Yahoo! Inc. All rights reserved. Privacy Policy – Terms of Service – Ad Feedback – Search Feedback

FIG. 11